United States Patent [19]

Miyadera et al.

[11] Patent Number: 4,937,809

[45] Date of Patent: Jun. 26, 1990

[54] OPTICAL INFORMATION RECORDING APPARATUS

[75] Inventors: Toshiyuki Miyadera; Shuichi Yanagisawa; Fumihiko Yokogawa, all of Saitama, Japan

[73] Assignee: Pioneer Electronic Corporation, Tokyo, Japan

[21] Appl. No.: 157,667

[22] Filed: Feb. 19, 1988

[30] Foreign Application Priority Data

Feb. 20, 1987 [JP] Japan .................................. 62-37458

[51] Int. Cl.$^5$ ................................................ G11B 7/00
[52] U.S. Cl. ....................................... 369/116; 369/106
[58] Field of Search ................. 369/106, 116, 48, 111, 369/124; 372/29; 360/65

[56] References Cited

U.S. PATENT DOCUMENTS 4,419,750 12/1983 Howe .................................. 369/116
4,577,329 3/1986 Yoshikawa et al. ................. 372/29

Primary Examiner—Steven L. Stephan
Attorney, Agent, or Firm—Sughrue, Mion, Zinn, Macpeak & Seas

[57] ABSTRACT

An optical recording apparatus of the type employing a read/write laser adapts the recording light beam to various linear speeds of the recording disk by jointly controlling both the beam power and the duty ratio of the recording signal in accordance with the radial position of the beam spot on the disk.

11 Claims, 3 Drawing Sheets

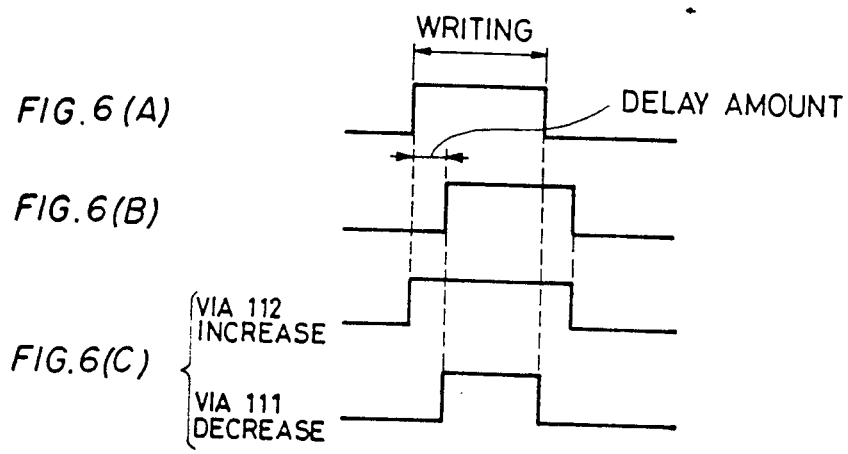
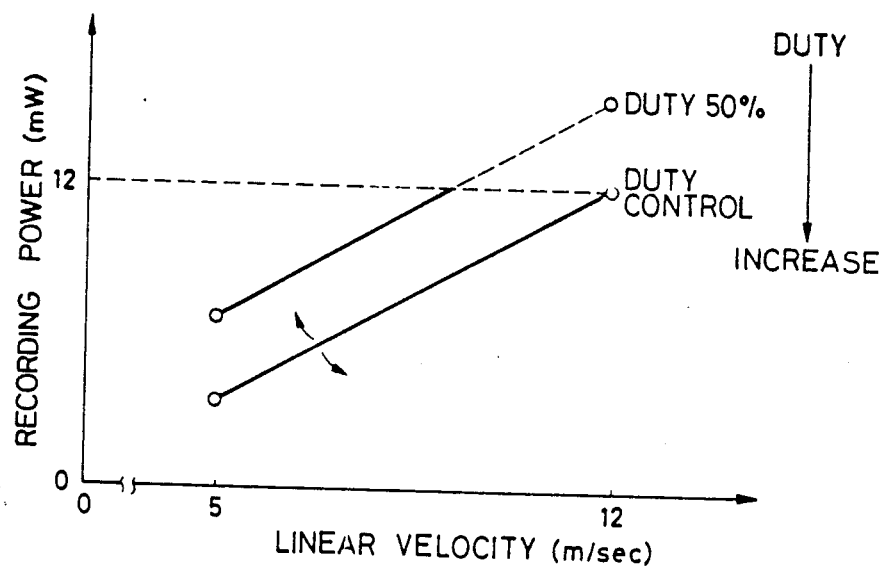

OPTICAL INFORMATION RECORDING APPARATUS

BACKGROUND OF THE INVENTION

1. Field of the Invention

The present invention generally relates to an optical information recording apparatus, and particularly relates to the driving apparatus for the light source which emits a light beam for recording.

2. Description of the Prior Art

In an optical information recording apparatus, generally, the duty ratio of the recording signal is fixed at 50%, and information is recorded by intermittently irradiating the information recording surface of a recording disk (hereinafter, simply referred to as a disk) with a recording light beam in accordance with the duty ratio. In a CAV disk (with fixed angular velocity). the linear velocity is different between inner and outer circumferences of the disk, and when the linear velocity is increased, the recording sensitivity is reduced. The reduction of the recording sensitivity with increasing linear velocity has been compensated by increasing the light power (the intensity of the light). that is, the recording power, of the recording light beam.

However, the power of the light emitted from a light source of a recording light beam, for example, a semiconductor laser, is limited, and therefore in a region beyond the output limitations of the light source, the reduction in sensitivity cannot be sufficiently compensated. As a result, in a high linear velocity region, the recording sensitivity has been frequently insufficient. If the recording sensitivity is low, the center of the so-called eye pattern of the reproduced waveform is displaced from a judgment reference level, and therefore a high-quality reproduced signal cannot be obtained.

SUMMARY OF THE INVENTION

It is therefore an object of the present invention to eliminate the foregoing disadvantages in the prior art.

It is another object of the present invention to provide an optical information recording apparatus in which, in recording a CAV disk, satisfactory recording sensitivity can be obtained over the entire recording region of the disk.

In the optical information recording apparatus according to the present invention, power control for controlling the light power of the recording light beam in accordance with the radial position of a recording light beam spot, as well as duty control for controlling the duty ratio of the recording signal in accordance with the radial position, are performed in combination.

BRIEF DESCRIPTION OF THE DRAWINGS

The advantages and attributes of the present invention will be apparent from the following detailed description taken in conjunction with the accompanying drawings, in which:

FIG. 6 consisting of (A)-(C), is a diagram showing operational waVeforms at various portions of the circuit of FIG. 5: and FIG. 7 is a diagram showing the relationship among the linear velocity, the recording power, and the duty ratio.

DETAILED DESCRIPTION OF THE PREFERRED EMBODIMENTS

An embodiment of the present invention will be described in detail with reference to the accompanying drawings hereunder.

Figure 1:
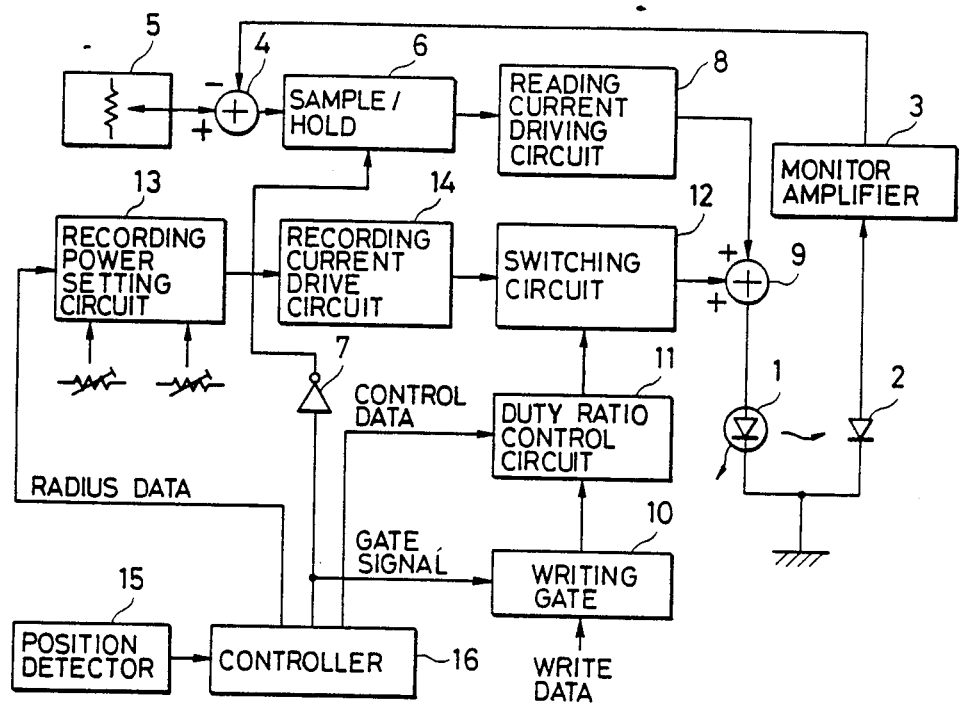
FIG. 1 is a block diagram showing an embodiment of the light source driving apparatus where the present invention is applied to an optical information recording-/reproducing apparatus.
Figure 2:
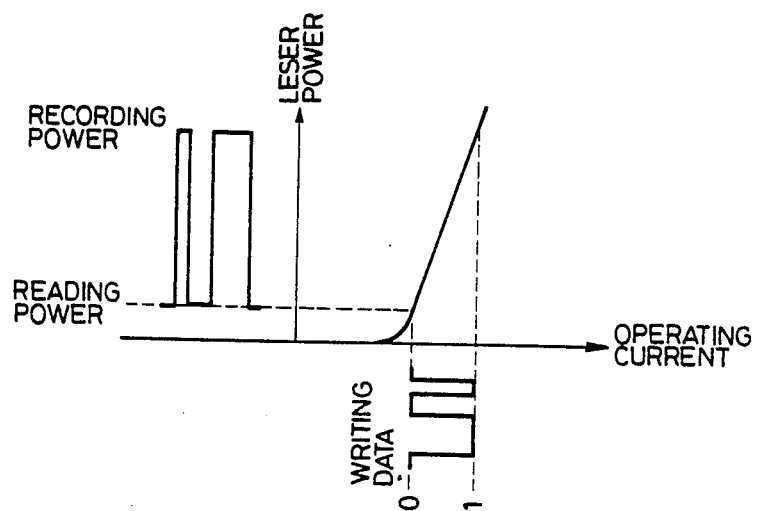
FIG. 2 is a diagram of an operational waveform, for explaining the recording power switching operation for writing data.

FIG. 1 is a block diagram showing an embodiment of the light source driving apparatus, the present invention being here applied to an optical information recording-/reproducing apparatus.

In the drawing, a laser diode 1 is used as a light source for emitting a recording/reading light beam for recording data on a disk and for reading out data from the disk, and a monitor diode 2 is built into the laser diode 1. The monitor diode 2 is provided for receiving a beam emitted from the rear of the laser diode 1, and the output of the monitor diode 2 is applied to a subtractor 4 through a monitor amplifier 3 so as to be subtracted from the output of a reading-power setting circuit 5 which sets the power of the reading light beam. That is, the light power is automatically controlled such that the output of the monitor diode 2 is fed back and compared with the desired power setting value set by the reading-power setting circuit 5, so as to maintain a constant light power independently of temperature. The output of the subtractor 4 is sampled and held in a sample-hold circuit 6 upon the application of a signal obtained by inverting a writing gate signal via inverter 7. The output of the sample-hold circuit 6 is applied to the laser diode 1 through a reading-current driving circuit 8 and an adder 9 so as to be used as the driving current for the laser diode 1.

Write data, on the other hand, are applied to a duty ratio control circuit 11 through a writing gate circuit 10 so as to control the duty ratio, and then applied to a switching circuit 12. In the writing of data, laser power (recording power) larger than the reading power is required. This recording power is set by a recording-power setting circuit 13, and a recording current corresponding to the set power value is applied from a recording-current driving circuit 14 to the switching circuit 12. The recording current is switched in accordance with the duty ratio of the writing data as set in the duty ratio control circuit 11, and is added at adder 9 to a reading current used in the reading operation conducted immediately before which value is held in the sample hold circuit 6, so as to be used as the driving current of the laser diode 1 in recording.

Figure 3:
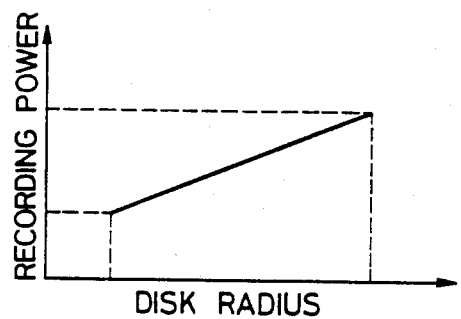
FIG. 3, is a diagram showing how the recording power is changed in accordance with the disk radial position.

On the CAV disk, the linear velocity is different between inner and outer circumferences of the disk, and larger recording power is required as the position approaches the outer circumference. Therefore, a position detector 15 is arranged to detect the position of the recording light spot (not shoWn) of the light beam emitted from the laser diode 1 on the information recording surface of the disk (not shown). in the radial direction of the disk, and a controller 16 is arranged to send radius data to the recording-power setting circuit 13 on the basis of the detected information. The recording-power setting circuit 13 is arranged so as to set the recording power value in accordance with the radius data. As a result, in recording the CAV disk, the recording power is changed in accordance with the radial position of the recording light spot on the disk, with the characteristic shown in FIG. 3.

The position detector 15 has been conventionally provided in optical information recording/reproducing devices so as to produce positional information in accordance with the radial position of the recording light spot in association with a pickup (not shown) provided with the laser diode 1 built therein.

The controller 16 is constituted, for example of a microcomputer, and is arranged to send out control data to the duty ratio control circuit 11, radius data to the recording-power setting circuit 13, and a gate signal to the writing gate circuit 10.

Figure 4:
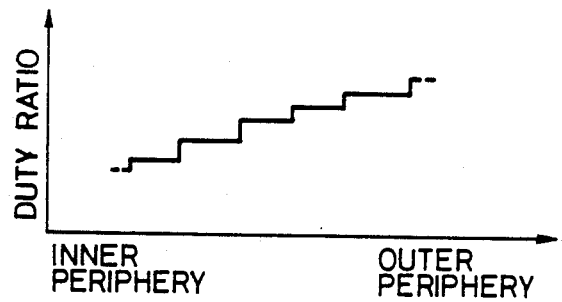
FIG. 4 is a diagram showing how the duty ratio is changed in accordance with disk radial position.
Figure 5:
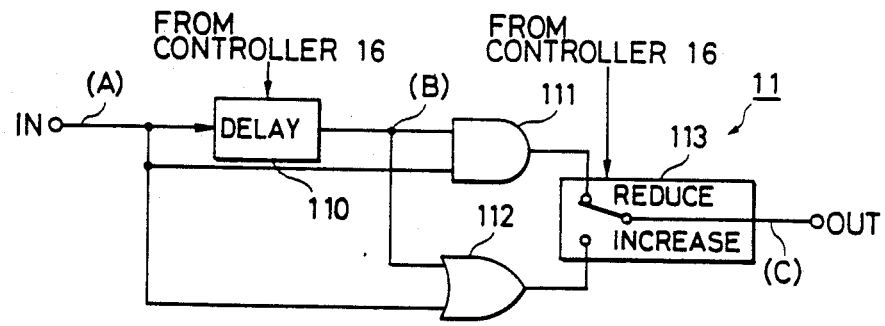
FIG. 5 is a block diagram specifically showing an example of the arrangement of the duty ratio control circuit of FIG. 1.

As described above, the power of the light emitted from the laser diode 1 has a limit, and sufficient recording power cannot be obtained for recording on the outer circumferential region of the disk where the linear velocity is high. Therefore, the low recording power is compensated by controlling the duty ratio of the write data stepwise in accordance with the radius data from the controller 16, via the duty ratio control circuit 11, using the characteristic shown in FIG. 4. As shown in FIG. 5, the duty ratio control circuit 11 is constituted of a delay circuit 110 for delaying writing data for a predetermined duration, an AND gate 111 and an OR gate 112 which receive the output data from the delay circuit 111 as well as the preceding writing data, and a selection switch 113 for alternatively producing as an output one of the outputs of the gates 111 and 112. The determination of the size of the delay of the delay circuit 110 and change-over control of the selection switch 113 are performed on the basis of control data from the controller 16. FIG. 6 shows waveforms at various portions of the circuit of FIG. 5. As seen from FIG. 6, the duty ratio is determined by the size of the delay of the delay circuit 110, and an increase or decrease in the duty ratio is determined by the change-over position of the selection switch 113.

Here, the duty ratio for maximizing the reproducibility of an RF 1T amplitude (T represents the bit period of the pulse-train signal) signal is considered. As a result of experimentation, it has been found that when the power is fixed, for example, at 12 mW, in order to maximize the reproducibility of the amplitude, the duty ratio should be set to 40% at the linear velocity of 6 [m/sec]-7 [m/sec], 50% at 8 [m/sec], 50 to 60% at 9 [m/sec]-10 [m/sec], and 60% at 11 [m/sec]. FIG. 7 shows the relation between the linear velocity, the recording power, and the duty ratio.

In the conventional apparatus, when the duty ratio is fixed at 50%, sufficient recording power cannot be obtained in the high linear velocity region because of the limited output of the laser diode 1. However, in the recording apparatus according to the present invention, it is possible to obtain sufficient recording power by varying the duty ratio, and specifically by setting the duty ratio to a value not smaller than 50% even in the region below the upper limit output of the laser diode 1.

If the same duty ratio as is used in the middle linear velocity region is used in the low linear velocity region, on the contrary, the center of the eye pattern of the reproduced waveform is considerably displaced from the reference level. Therefore, in the low linear velocity region, it is possible to obtain a higher-quality reproduced signal if the duty ratio is controlled to a value not larger than 50%. In this case, the recording power is thus set to a value larger than that when the duty ratio is 50%, in the recording-power setting circuit 13, to thereby cause the center of the eye pattern of the reproduced waveform to coincide with the judgment reference level.

Thus, in the region below the maximum output of the laser diode 1, a higher-quality reproduced signal than has been obtained in recording/reproducing with the duty ratio fixed at 50% can be obtained by using both controls, that is, the duty ratio control and the power control, in a suitable combination, in accordance with the radial position of the recording light spot.

As described above, in the optical information recording apparatus according to the present invention, the power control for controlling the light power of a recording light beam in accordance with the radial position of a recording light beam spot, and duty ratio control for controlling the duty ratio of a recording signal in accordance with the radial position, are used in combination. In recording a CAV disk it is thereby made possible to obtain satisfactory recording sensitivity over the entire recording region of the disk.

What is claimed is:

1. An optical information recording apparatus for recording information by irradiating an information recording surface of a recording disk with a recording light beam in accordance with a recording signal, said apparatus comprising: means for controlling the power of said recording light beam in accordance with a radial position of a light spot of said recording light beam on said recording disk, and means for controlling a duty ratio of said recording signal in accordance with said radial position, wherein said duty ratio is increased as said radial position is increased.

2. An apparatus as claimed in claim 1, wherein said means for controlling the power of said recording light beam comprises controller means for generating data corresponding to said radial position, and means for setting a value of the power of said recording light beam in accordance with said radial position data.

3. An apparatus as claimed in claim 2, further comprising position detector means coupled to said controller means for generating a signal related to a position of said light spot on said recording disk.

4. An apparatus as claimed in claim 2, further comprising recording current drive circuit means for generating a recording current in correspondence with said power value set by said means for setting a value of the power of said recording light beam, and switching circuit means coupled to an output of said recording current drive circuit means.

5. An apparatus as claimed in claim 4, wherein said recording light beam is generated by a laser diode.

6. An apparatus as claimed in claim 5, further comprising reading current driving circuit means for generating a reading current, said laser diode responding to said reading current to generate a reading light beam for reading recorded data from said recording disk.

7. An apparatus as claimed in claim 6, further including adder means coupled to outputs of said reading current driving circuit means and said switching circuit means, for combining said outputs to form a drive current for said laser diode.

8. An apparatus as claimed in claim 4, wherein said means for controlling a duty ratio comprises duty ratio control circuit means for setting a duty ratio in response to control data generated by said means for controlling, said duty ratio control circuit means having an output coupled to said switching means.

9. An apparatus as claimed in claim 8, further including writing gate means for receiving write data, said means for controlling generating a gate signal on a signal line coupled to said writing gate means, an output of said writing gate means being coupled to said duty ratio control circuit.

10. An apparatus as claimed in claim 1, wherein said duty ratio is set at a value between 40% to 60%, in correspondence with the linear velocity of said recording disk at the location of said light spot, such that said duty ratio is lower at lower values of said linear velocity and higher at higher values of said linear velocity.

11. An apparatus as claimed in claim 10, wherein said duty ratio is set at a minimum value of 40% at a linear velocity of 6 meters/second and at a maximum value of 60%, at a linear velocity of 11 meters/second.

* * * * *